United States Patent
Sathe et al.

(10) Patent No.: US 8,248,945 B1
(45) Date of Patent: Aug. 21, 2012

(54) SYSTEM AND METHOD FOR ETHERNET PER PRIORITY PAUSE PACKET FLOW CONTROL BUFFERING

(75) Inventors: Satish Sathe, San Ramon, CA (US); Satish Singh, Patna (IN); Jaspreet Singh Gambhir, Delhi (IN); Sundeep Gupta, Maharashtra (IN)

(73) Assignee: Applied Micro Circuits Corporation, San Diego, CA (US)

( * ) Notice: Subject to any disclaimer, the term of this patent is extended or adjusted under 35 U.S.C. 154(b) by 376 days.

(21) Appl. No.: 12/758,717

(22) Filed: Apr. 12, 2010

(51) Int. Cl.
*G01R 31/08* (2006.01)
(52) U.S. Cl. ........................................ 370/235
(58) Field of Classification Search .................. 370/229, 370/230, 235, 368, 395.42, 389, 392, 363, 370/428, 429, 412, 241
See application file for complete search history.

(56) References Cited

U.S. PATENT DOCUMENTS

| | | | |
|---|---|---|---|
| 2002/0118640 A1* | 8/2002 | Oberman et al. | 370/230 |
| 2009/0279559 A1* | 11/2009 | Wong et al. | 370/412 |
| 2009/0303876 A1* | 12/2009 | Wu | 370/230.1 |

* cited by examiner

*Primary Examiner* — Kwang B Yao
*Assistant Examiner* — Anh Ngoc Nguyen
(74) *Attorney, Agent, or Firm* — Law Office of Gerald Maliszewski; Gerald Maliszewski

(57) ABSTRACT

A method is provided for managing a transmit buffer using per priority pause flow control. An Ethernet transceiver generates packet descriptors identifying packets to be transmitted that are stored in memory. A priority is assigned to each descriptor and associated packet. Each descriptor is loaded into a queue having a queue priority associated with the descriptor priority. In response to accessing a first descriptor, output from a selected first priority queue, a first packet associated with the first descriptor is fetched into a transmit buffer from the memory. If subsequent to fetching the first packet, a per priority flow control message is received pausing first priority packets, the first packet is flushed from the transmit buffer. Then, a second descriptor is accessed from a selected second priority queue, and a second packet associated with the second descriptor is fetched and transmitted from the transmit buffer.

15 Claims, 6 Drawing Sheets

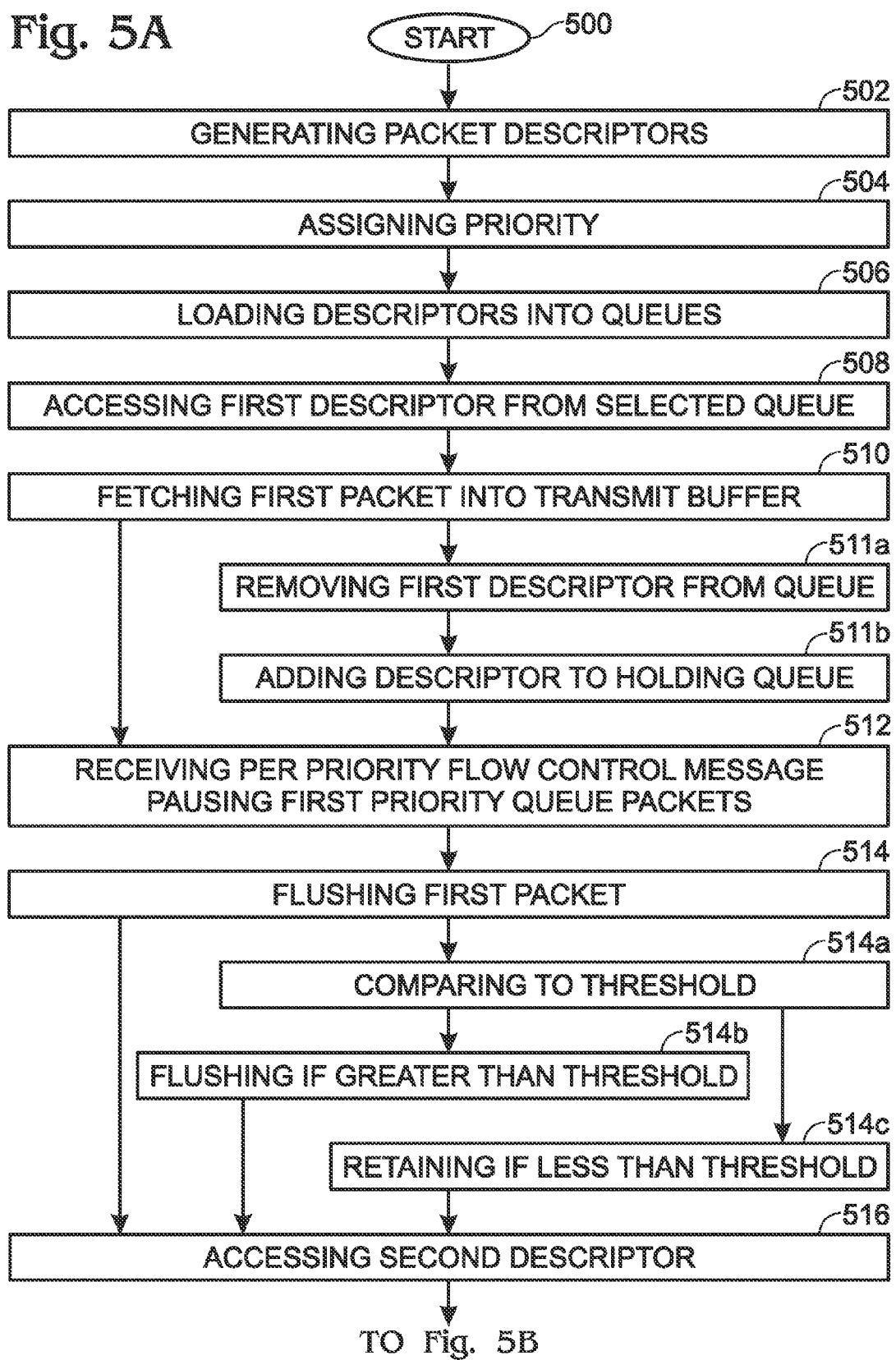

SYSTEM AND METHOD FOR ETHERNET PER PRIORITY PAUSE PACKET FLOW CONTROL BUFFERING

BACKGROUND OF THE INVENTION

1. Field of the Invention

This invention generally relates to digital communications and, more particularly, to a system and method for controlling the transmit buffering of Ethernet communications.

2. Description of the Related Art

In typical Ethernet transmit implementation, the entire packet or a part of the packet is loaded into an on-chip first-in first-out (FIFO) memory before transmission begins. This is done in order to decouple the latency of fetching the packet from memory, from the bandwidth of the transmission medium. This decoupling becomes critical if the latency of fetching the packet from memory is longer than the transmission latency, or if the latency of fetching the packet from memory is unpredictable, as not doing so can cause the FIFO to underflow in the middle of the packet transmission.

The entire packet needs to be fetched on-chip before transmission if the egress port supports TCP and UDP checksum offload, as the checksum is located in the packet header, but is calculated over the entire payload. Therefore, the hardware must store the entire payload while it is calculating the checksum. Typically, the hardware must store more than one maximum packet in order to pipeline the processing and keep up with the maximum transmission rate. For example, if a port supports 9.6 kilobyte (KB) packets, it may implement a 16 KB or 32 KB FIFO. This is not an issue when a port supports a single traffic class and the maximum packet size supported is small. However, as packet sizes become larger and the number of traffic classes grows, the storage requirements become significant, especially in a device that supports multiple Ethernet interfaces.

There are implementations that share the FIFO between different traffic classes and determine which traffic class to service before the packet is fetched from memory. This approach works well when the Ethernet port does not support Per Priority Pause. However, when Per Priority Pause is enabled, then this implementation can experience head-of-line blocking if the packet that has been fetched into the on-chip FIFO, has not yet commenced transmission on the Ethernet, is associated with a traffic class that has just been paused by a remote node, and there are other traffic classes that have data to send and have not been paused. In this situation, this implementation experiences head-of-line blocking as the first packet will occupy the FIFO and all other traffic classes must wait until that first packet traffic class resumes transmission.

To get around this problem, some implementations use a random access memory (RAM) instead of a FIFO in order to fetch packets out of order, in case the first packet is for a traffic class that has been paused, but subsequent packets are for traffic classes that have not been paused. However, this implementation can require a large amount of buffering if multiple traffic classes are permitted to have the largest size packets stuck in the RAM, while still allowing other, unpaused, traffic classes to transmit. A tradeoff can be made in this implementation between the maximum number of traffic classes that can be paused simultaneously before head-of-line blocking occurs, and the size of the RAM. One end of the spectrum would use a small RAM but experience head-of-line blocking whenever one traffic class is paused, while the other end of the spectrum requires a large RAM and experiences no blocking. If one assumes a 9.6 KB packet size and assumes at least one packet storage per traffic class supported per Ethernet port, this results in 9.6 KB×8=76.8 KB of RAM.

The calculation of the conventional receive buffer size is largely based upon receiver considerations. As noted in the IEEE 802.1Qbb standard, in order to assure that frames are not lost due to lack of receive buffer space, receivers must ensure that a PFC PAUSE frame is sent while there remains sufficient receive buffer to absorb the data that may continue to be received while the system is responding to the PFC PAUSE. The precise calculation of this buffer requirement is highly implementation dependent.

The processing and queuing delays are the time required for a station to detect that it is low on receive buffer, queue the appropriate PFC PAUSE, finish transmitting any frame currently being transmitted, and then transmit the PFC PAUSE. In general, the time to detect the need to transmit the PFC PAUSE and queue it is negligible. However, this may occur just as the transmitter is beginning to transmit a maximum length frame. Assuming a maximum length frame of 2000 octets, and a PFC PAUSE frame of 64 octets, the total worst case delay would be 16,512 bit times. This value would need to be increased appropriately if larger frame sizes are supported or if additional processing time is required within the implementation.

Next, the propagation delay across the media must be considered. The propagation delay across twisted pair is approximately $0.66 \times C$ where C is the speed of light ($3 \times 10^8$ m/s). Thus, for 10G 802.3 links, the propagation delay works out to $10^{10}/0.66$ C bit times/m. Assuming a fiber length of 100 m, 5051 bit times results.

The response time for 10GBASE-T is 14,336 bit times plus the PHY delay of 25,600 bit times (see clause 55.11 of IEEE Std 802.3an™-2006) for a total of 39,936 bit times. In addition, it is possible that a maximum length frame has just begun transmission, thus adding 16,000 bit times for a total of 55,936 bit times. Finally, the return propagation delay (which accounts for data that is already in transit when the PFC PAUSE takes affect), accounts for an additional 5051 bit times. This results in a grand total of 82,550 bits (approximately 10.1 KB) of buffering required for a 100 m 10 Gb/s link. As stated previously, more or less buffering may be required to account for implementation specific characteristics such as larger frame sizes, variances in the processing time of generating the PFC PAUSE frame, granularity of buffer allocation and possible sharing of buffers, among others factors. However, in general, the buffer requirements are approximately 2×(media delay+maximum frame length)+length of PFC PAUSE+the responding end response time.

It would be advantageous if the above-mentioned buffer explosion problem could be solved without any head-of-line blocking, retaining the conventional buffer requirement needed for a port with a single traffic class, while still supporting the maximum number of traffic classes possible on the Ethernet port.

SUMMARY OF THE INVENTION

Disclosed herein are a system and method for optimizing outbound packet processing in an Ethernet port that supports multiple traffic classes and per priority pause. The above-mentioned transmit buffering problems are solved by storing the packet descriptor associated with each packet and traffic class on-chip until the packet, pointed to by that descriptor, has initiated transmission on the Ethernet port. If the packet is paused between the time it has been selected for transmission, and its data is being fetched from memory but has not initiated transmission, then the packet is flushed from the transmit RAM or FIFO. Any read requests not yet initiated for that packet are dropped. When that traffic class is unpaused, the packet descriptor for this packet is added back to the head of the descriptor list for that traffic class. When the traffic class is eventually unpaused, packets from that traffic class are reselected and transmitted in the same order in which they were queued. For example, if the descriptor size is 64 B for a 9.6 KB packet, the buffer requirement for handling per priority pause with multiple traffic classes and inline TCP checksum processing drops from 76.8 KB of buffering to 9.6 KB+8*64 B=approximately 10 KB.

This innovation may require that a packet experiencing a per priority pause after being selected for transmission and fetched from memory, be dropped and read again from memory when the traffic class is unpaused. However, this does not change the bandwidth requirement for memory significantly as a traffic class stays in pause state for multiple packet times.

Accordingly, a method is provided for managing a transmit buffer using per priority pause flow control. An Ethernet transceiver generates packet descriptors identifying packets to be transmitted that are stored in memory. A priority (e.g. a traffic class) is assigned to each descriptor and associated packet. Each descriptor is loaded into a queue having a queue priority associated with the descriptor priority. In response to accessing a first descriptor, output from a selected first priority queue, a first packet associated with the first descriptor is fetched into a transmit buffer from the memory. If subsequent to fetching the first packet, a per priority flow control message is received pausing first priority packets, the first packet is flushed from the transmit buffer. Then, a second descriptor is accessed, output from a selected second priority queue, and a second packet associated with the second descriptor is fetched into the transmit buffer from the memory. The second packet is transmitted from the transmit buffer.

If subsequent to transmitting the second packet, a first priority queue packet reinstatement operation is performed, then the first priority queue is selected, the first descriptor reaccessed, the first packet is fetched into the transmit buffer from the memory and transmitted from the transmit buffer. The first priority queue packet reinstatement operation can be the result of receiving a per priority flow control message unpausing first priority queue packets, or the result of letting expire the per priority flow control message pausing the first priority queue packets.

Additional details of the above-described method, and a system for managing a transmit buffer using per priority pause flow control, are provided below.

BRIEF DESCRIPTION OF THE DRAWINGS

FIGS. 5A and 5B are flowcharts illustrating a method for managing a transmit buffer using per priority pause flow control in an Ethernet transceiver.

DETAILED DESCRIPTION

Figure 1:
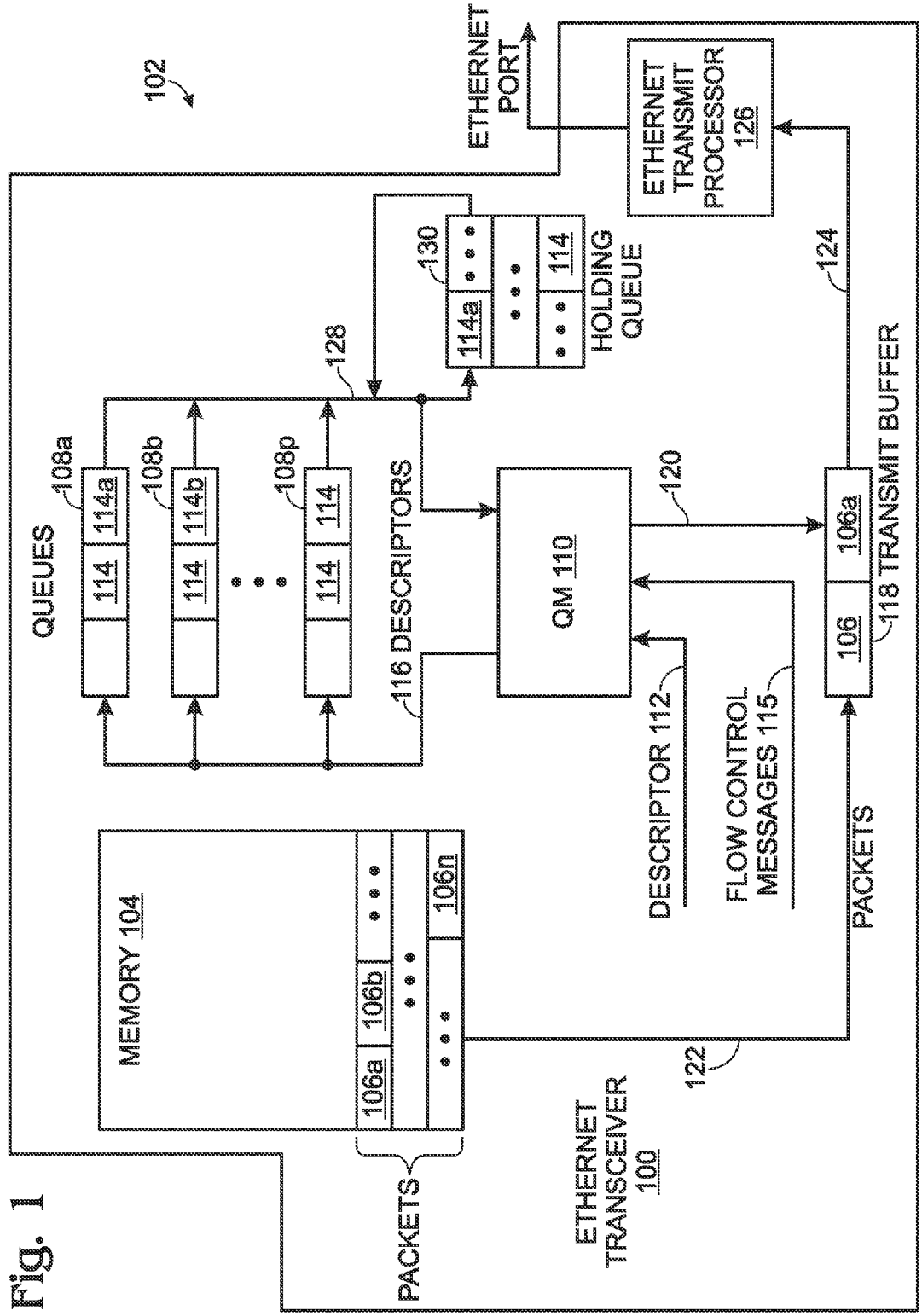
FIG. 1 is a schematic block diagram of an Ethernet transceiver with a system for managing a transmit buffer using per priority pause flow control.

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The devices described below may employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. For simplicity, all the memories associated with any particular device are shown as one element. The execution of the sequences of instructions contained in a computer-readable medium may cause a processor to perform some of the steps associated with the described functions. Alternately, these functions, or some of these functions may be performed in hardware. The practical implementation of components of the system as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

FIG. 1 is a schematic block diagram of an Ethernet transceiver 100 with a system for managing a transmit buffer using per priority pause flow control. The system 102 comprises a memory 104 including packets 106 to be transmitted. The system includes a plurality of parallel queues 108, where each queue has a queue priority. The queue priority may be associated with a traffic class, class of service (COS), or flow for example. Traffic classes may be associated with one or more queues implemented on a port in a manner so that each class has its own queuing resources, but shares the transmission media with the other traffic classes. The method of sharing is determined by some algorithm that meets the bandwidth requirements and traffic profile of each traffic class.

Shown are queues 108*a* through 108*p*, where p is a variable not limited to any particular value. In this example, 108*a* has a higher priority than queue 108*b*, and queue 108*b* has a higher priority than queue 108p. In one aspect, the queues 108 are first-in first out (FIFO) memories.

A queue manager (QM) 110 has an interface on line 112 for receiving packet descriptors 114 identifying packets 106 in memory, and an interface on line 115 for receiving flow control messages. The queue manger 110 assigns a priority to each descriptor 114 and associated packet 106. The QM 110 has an output on line 116 for loading each descriptor into a queue having a queue priority associated with the descriptor priority. More explicitly, a transmitting entity such as a processor (not shown) writes the descriptors to the queue manager, once it has loaded the packets to transmit into memory. Likewise, this processor would write these descriptors, from the queue manager, into the transmit buffer. In this example, descriptor 114a is associated with packet 106a, and descriptor 114b with packet 106b, etc. A descriptor is a data structure that contains the address at which the packet data and/or headers are contained. The descriptor may also include other information concerning its associated packet, such as the size of the packet, the number of bytes in the packet, and the way in which the packet should be transmitted. In another aspect, the descriptor may be a pointer to a table entry in memory that has information concerning an associated packet.

A transmit buffer 118 has an interface on line 120 for communication with the queue manager 110, an input on line 122 to accept packets from the memory 104, and an output on line 124 to supply packets for transmission to an Ethernet transmit processor 126. The queue manager 110 has an interface on line 128 for reading a first descriptor (e.g., descriptor 114a) from a selected first queue (e.g., queue 108a). The QM 110 orders the transmit buffer 118 to load a first packet 106a associated with the first descriptor 114a, from the memory 104. More explicitly, an Ethernet transmit processor entity (not shown) may read a descriptor from a queue, obtain a memory address from the descriptor, and read the packet from the memory.

In one aspect, the transmit buffer 118 has a capacity of up to 2 maximum size packets. A maximum packet size is the largest packet size of the particular communication protocol being used. Thus, if the transmit buffer has a 10 kilobyte (KB) capacity, a maximum size packet would be about 5 KB. In another aspect, an Ethernet jumbo frame is 9,000 bytes, so that the transmit buffer is this case would be about 18,000 bytes.

In another aspect, a holding queue 130 is used. The first descriptor 114a is moved from the first queue 108a to the holding queue 130 in response to loading the first packet 106a into the transmit buffer 118, and deleted from the holding queue 130 in response to the transmit buffer transmitting the first packet. The holding queue 130 is typically a RAM (as shown). This is to avoid the case where two priorities are paused and have descriptors in the holding queue, and the second priority is the first to be unpaused. If the holding queue is not a FIFO, or if the holding queue comprising a FIFO for each queue priority, then a blocking problem does not occur.

Figure 2:
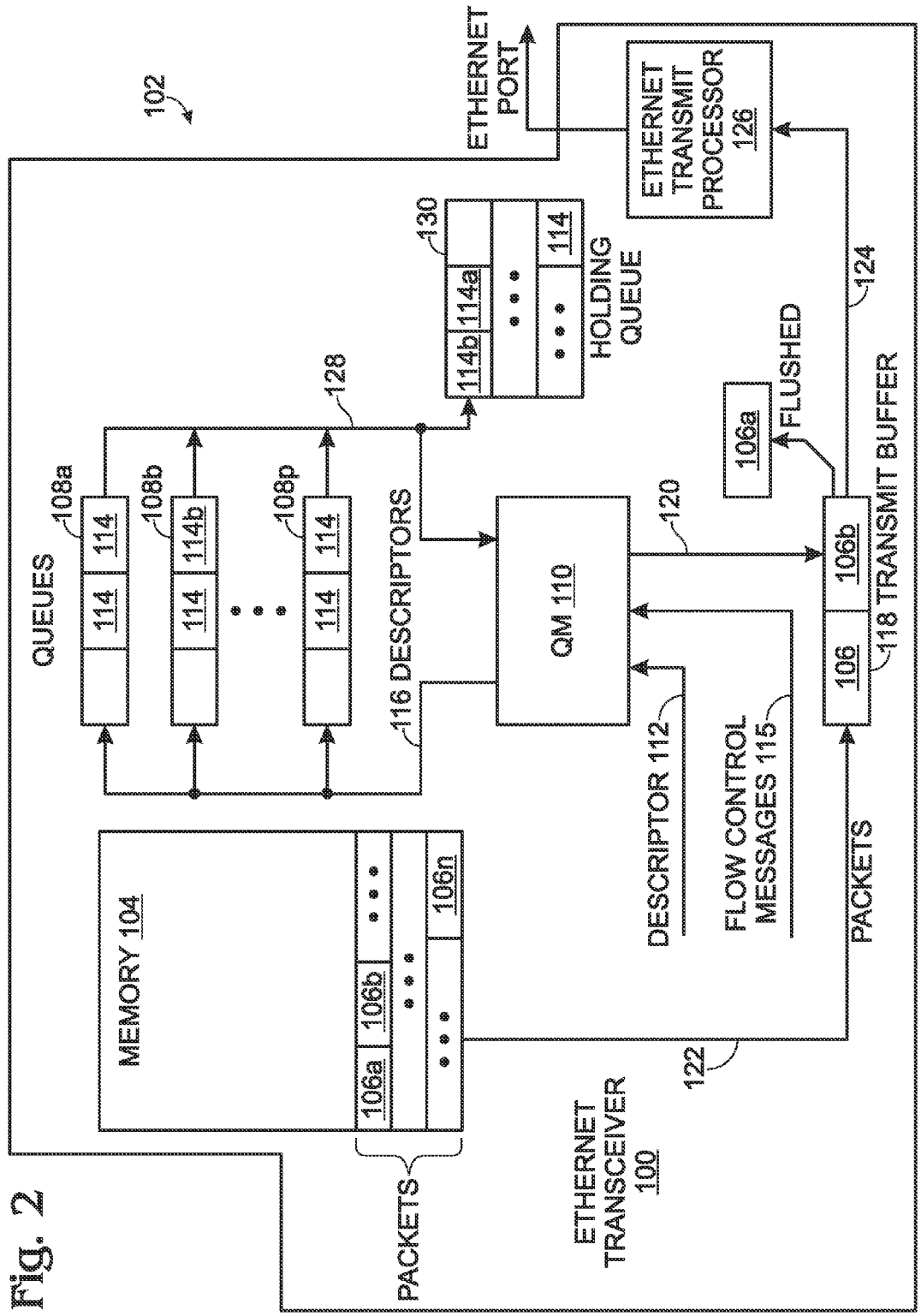
FIG. 2 is a schematic block diagram depicting the system of FIG. 1 after the receipt of a per priority flow control message.

FIG. 2 is a schematic block diagram depicting the system of FIG. 1 after the receipt of a per priority flow control message. If, subsequent to the loading of the first packet 106a in the transmit buffer 118, the queue manager 110 receives a per priority flow control message pausing first priority queue packets (e.g., the packets associated with the descriptors in queue 108a), the QM 110 orders the transmit buffer to flush the first packet 106a. Per priority flow control is a mechanism for indicating on an Ethernet source port, the rate of one (or several) of the priorities to a particular destination port. Per priority flow control is defined in the IEEE standards and understood by practitioners in the art. A pause frame is an Ethernet frame sent from the destination port to a source port informing the source port to adjust the rate at which it is sending frames to the destination port.

The QM 110 reads a second descriptor (e.g., descriptor 114b) from a selected second queue (e.g., queue 108b), and orders the transmit buffer 118 to load a second packet 106b associated with the second descriptor 114b, from the memory 104. Then, the transmit buffer 118 transmits the second packet to the Ethernet transmit processor 126. Typically, the second queue 108b is selected in response to the second queue being the highest priority queue, excluding the first queue 108a (and any other queues that have been paused) from consideration.

Figure 3:
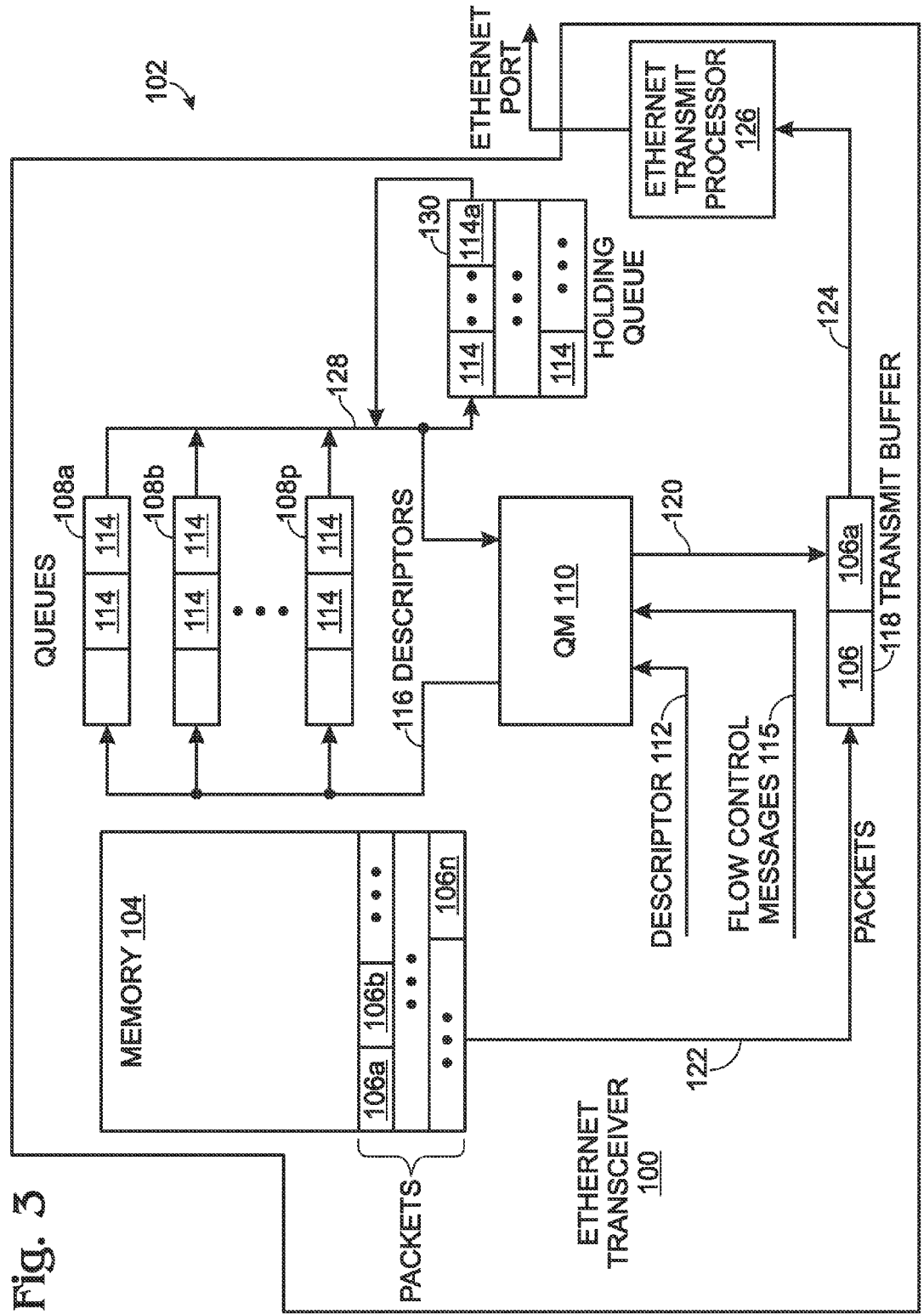
FIG. 3 is a schematic block diagram depicting the system of FIG. 2 after a first queue packet reinstatement.

FIG. 3 is a schematic block diagram depicting the system of FIG. 2 after a first queue packet reinstatement. If subsequent to the transmission of the second packet, the queue manager 110 initiates a first queue packet reinstatement, it orders the transmit buffer 118 to load the first packet 106a from memory 104, and the transmit buffer 118 transmits the first packet 106a to the Ethernet transmit processor 126. Some examples of a first queue packet reinstatement operation include the QM 110 receiving a per priority flow control message unpausing first priority packets, or the QM 110 letting expire the per priority flow control message pausing the first priority packets.

Figure 4:
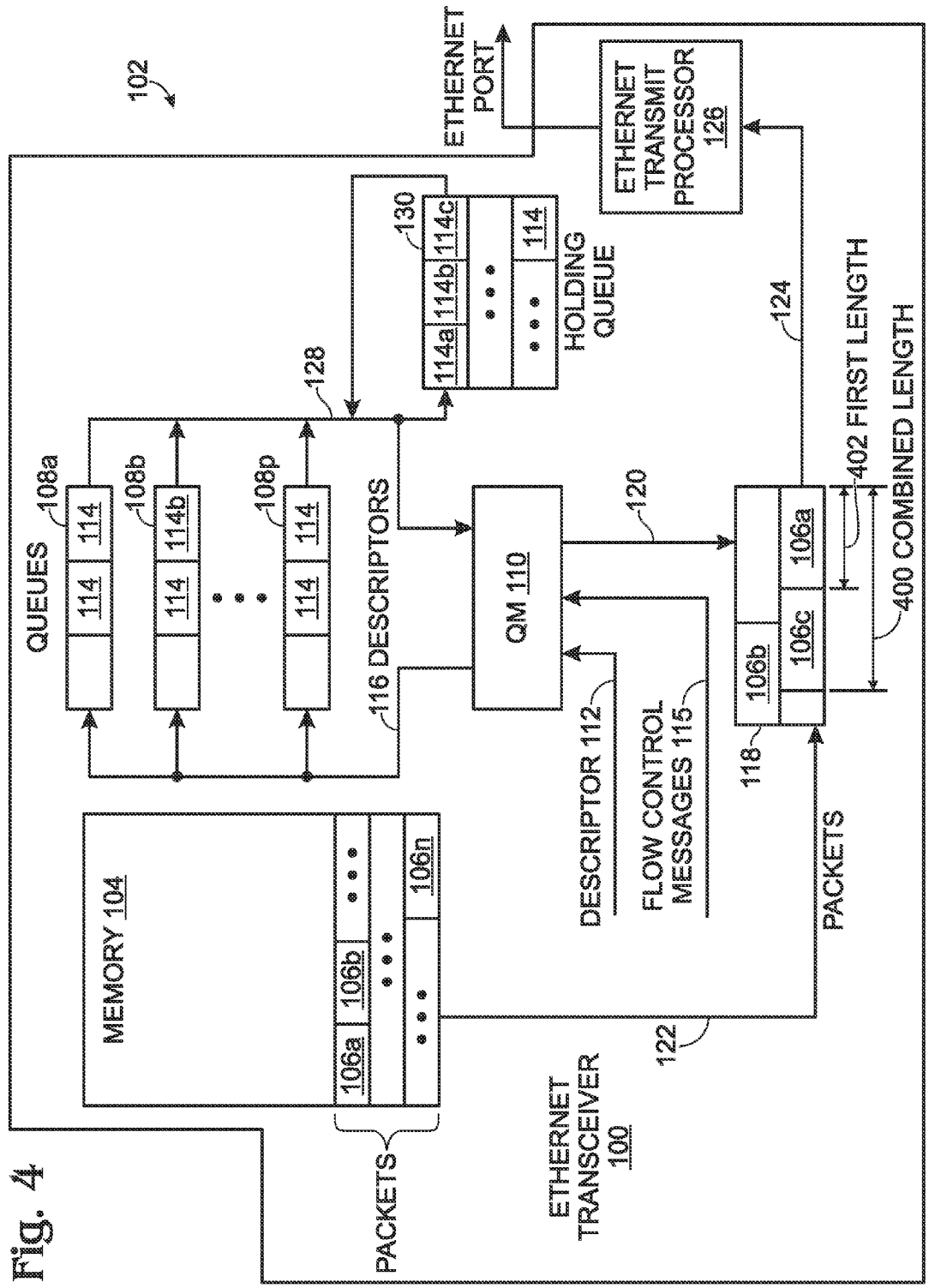
FIG. 4 is a schematic block diagram depicting a variation of the system of FIG. 1 after the receipt of a per priority flow control message.

FIG. 4 is a schematic block diagram depicting a variation of the system of FIG. 1 after the receipt of a per priority flow control message. In this aspect, subsequent to receiving the per priority flow control message, the queue manager 110 compares a combined length 400 or number of bytes, equal to a first packet length 402 plus the lengths of any first priority queue packets already in the transmit buffer 118, to a minimum length flush threshold. If the combined length is greater than the flush threshold, the QM 110 orders the transmit buffer 118 to flush the first packet 106a. However, if the combined length 400 is less than the threshold, the QM 110 orders the transmit buffer 118 to retain the first packet 106a. The transmit buffer 118 transmits the first packet to the Ethernet transmit processor 126 in response to the queue manager QM initiating the first queue packet reinstatement. If the combined length 400 exceeds the threshold before the first queue packet reinstatement, the first packet 106a is flushed. In this aspect, the transmit buffer 118 is typically a RAM.

Although the above-described system would most typically be enabled exclusively from hardware components, some of the modules, such as the queue manager, may be software applications stored in memory, and connected to a microprocessor via a data/address bus. In that case, the modules are enabled as software instructions that are executed by the microprocessor. Alternately (not shown), an operating system (OS) is used to manage such an application, as well as other applications (not shown), such as might be embedded in a personal computer or server.

Functional Description

The system of FIG. 1 solves the head-of-line blocking problem associated with the use of traffic classes and per priority flow control by storing the packet descriptor associated with each packet and traffic class on-chip until the packet pointed to by that descriptor has initiated transmission on the Ethernet port. If the packet does get paused between the time it has been selected for transmission, and its data is being fetched from memory but has not initiated transmission, then the packet is flushed from the transmit RAM or FIFO. Any read requests not yet initiated for that packet are dropped. When that traffic class is unpaused, the packet descriptor for this packet is added back to the head of the descriptor list for that traffic class, so that when the traffic class is unpaused, packets from that traffic class are reselected and transmitted in the same order in which they were queued. Since a typical descriptor size is 64 B for a 9.6 KB packet, the buffer requirement for handling per priority pause with multiple traffic classes and inline TCP checksum processing drops from 76.8 KB of buffering to 9.6 KB+8*64 B=approximately 10 KB.

This innovation does require that the packet that experienced the per priority pause after being fetching from memory, be dropped and read again from memory when the traffic class is unpaused. An optimization to this innovation examines the size of the paused packet that is in the transmit buffer, and only drops the packet if its size is likely to have an adverse effect on performance if it is left inside the transmit buffer memory, or if the total amount of transmit buffer used up by packets that are for paused traffic classes is above a size that will likely have an adverse effect on performance. If this size of packets is small enough, then those packets can be left in the transmit buffer so that they need not be refetched when their traffic class is unpaused.

The arbitration policy for selecting the next traffic class for service is also modified to examine that traffic class's pause state and only consider it for selection if the traffic class is not currently paused. This prevents the packet from being unnecessarily selected for servicing.

Figure 5B:
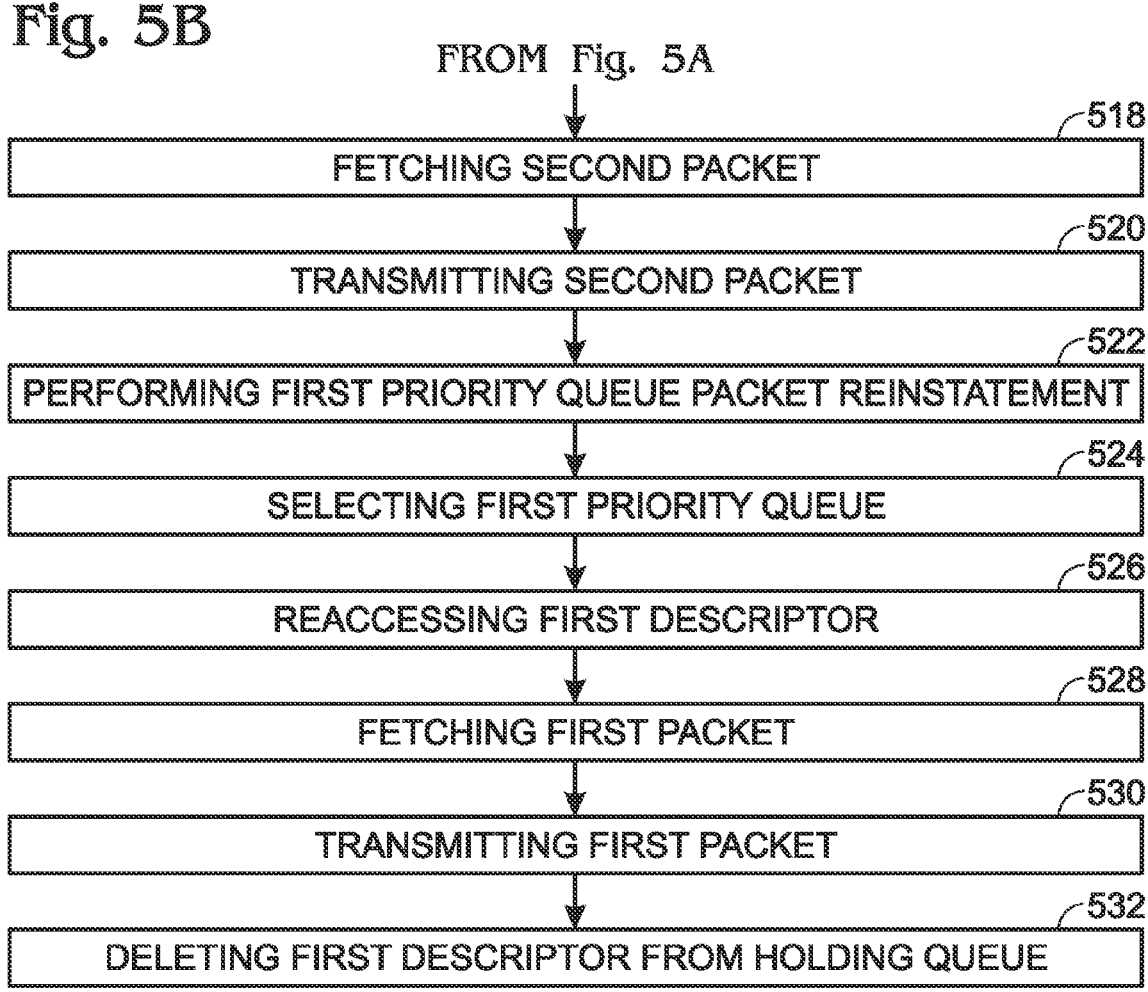

FIGS. 5A and 5B are flowcharts illustrating a method for managing a transmit buffer using per priority pause flow control in an Ethernet transceiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Typically however, the steps are performed in numerical order. The method starts at Step 500.

In Step 502 an Ethernet transceiver generates packet descriptors identifying packets to be transmitted that are stored in memory. Step 504 assigns a priority to each descriptor and associated packet. Step 506 loads each descriptor into a queue having a queue priority associated with the descriptor priority. For example, the descriptor queues may be FIFO memories. Step 508 accesses a first descriptor output from a selected first priority queue. Step 510 fetches a first packet associated with the first descriptor, into a transmit buffer from the memory. In one aspect, the transmit buffer has a capacity of less than 2 maximum size packets.

Subsequent to fetching the first packet, Step 512 receives a per priority flow control message pausing first priority queue packets. Step 514 flushes the first packet from the transmit buffer. Step 516 accesses a second descriptor, output from a selected second priority queue. In one aspect, accessing the second descriptor from the selected second priority queue includes selecting a descriptor from the highest priority queue, excluding the first priority queue (and any other paused queues) from consideration. Step 518 fetches a second packet associated with the second descriptor, into the transmit buffer from the memory, and Step 520 transmits the second packet from the transmit buffer.

Subsequent to transmitting the second packet in Step 520, Step 522 performs a first priority queue packet reinstatement operation, which may be the receipt of a per priority flow control message unpausing first priority queue packets, or the expiration of the per priority flow control message pausing the first priority queue packets. Then, Step 524 selects the first priority queue. Step 526 reaccesses the first descriptor. Step 528 fetches the first packet into the transmit buffer from the memory, and Step 530 transmits the first packet from the transmit buffer.

In one aspect, flushing the first packet from the transmit buffer in Step 514 includes the following substeps. Step 514*a* compares a combined length to a minimum length flush threshold, where the combined length is equal to a length of the first packet added to the lengths of any first priority queue packets already in the transmit buffer. If a combined length is greater than the flush threshold, Step 514*b* flushes the first packet from the transmit buffer. If the combined length is less than the threshold, Step 514*c* retains the first packet in the transmit buffer, and subsequent to the first queue packet reinstatement operation (Step 522), Step 530 transmits the first packet from the transmit buffer. Note, if Step 514*c* is performed, Step 528 of fetching the first packet from memory is omitted.

In one aspect, subsequent to fetching the first packet into the transmit buffer (Step 510), Step 511*a* removes the first descriptor from the first priority queue, and step 511*b* adds the first descriptor to a holding queue. For example, the holding queue may be a RAM memory. In response to transmitting the first packet from the transmit buffer, Step 532 deletes the first descriptor from the holding queue. In this aspect, reaccessing the first descriptor in Step 526 includes reaccessing the first descriptor from the holding queue, in response to the first priority packet reinstatement operation.

A system and method has been presented for managing a transmit buffer using per priority pause flow control. Examples of particular modules and process flows have been given to illustrate the invention. However, the invention is not limited to merely these examples. Other variations and embodiments of the invention will occur to those skilled in the art.

We claim:

1. A method for managing a transmit buffer using per priority pause flow control, the method comprising: generating packet descriptors, by an Ethernet transceiver, identifying packets to be transmitted that are stored in memory; assigning a priority to each descriptor and associated packet; loading each descriptor into a descriptor queue having a queue priority associated with the descriptor priority; accessing a first descriptor, output from a selected first priority descriptor queue; fetching a first packet associated with the first descriptor, into a transmit buffer from the memory; subsequent to fetching the first packet, receiving a per priority flow control message pausing first priority queue packets; flushing the first packet from the transmit buffer; accessing a second descriptor, output from a selected second priority descriptor queue; fetching a second packet associated with the second descriptor, into the transmit buffer from the memory; and, transmitting the second packet from the transmit buffer.

2. The method of claim 1 further comprising:
subsequent to transmitting the second packet, performing a first priority queue packet reinstatement operation selected from a group consisting of receiving a per priority flow control message unpausing first priority queue packets and letting expire the per priority flow control message pausing the first priority queue packets;
selecting the first priority descriptor queue;
reaccessing the first descriptor;
fetching the first packet into the transmit buffer from the memory; and,
transmitting the first packet from the transmit buffer.

3. The method of claim 1 wherein fetching the first packet into the transmit buffer includes fetching the first packet into a transmit buffer having a capacity of less than 2 maximum size packets.

4. The method of claim 2 wherein flushing the first packet from the transmit buffer includes:
   comparing a combined length to a minimum length flush threshold, where the combined length is equal to a length of the first packet added to the lengths of any first priority queue packets already in the transmit buffer;
   if a combined length is greater than the flush threshold, flushing the first packet from the transmit buffer; and;
   if the combined length is less than the threshold, retaining the first packet in the transmit buffer.

5. The method of claim 1 wherein accessing the second descriptor from the selected second priority descriptor queue includes selecting a descriptor from the highest priority descriptor queue, excluding the first priority descriptor queue from consideration.

6. The method of claim 2 further comprising:
   subsequent to fetching the first packet into the transmit buffer, removing the first descriptor from the first priority queue;
   adding the first descriptor to a holding queue; and,
   in response to transmitting the first packet from the transmit buffer, deleting the first descriptor from the holding queue.

7. The method of claim 6 wherein reaccessing the first descriptor includes reaccessing the first descriptor from the holding queue, in response to the first priority packet reinstatement operation.

8. The method of claim 1 wherein loading each descriptor into the descriptor queue having the queue priority matching the descriptor priority includes loading each descriptor into a FIFO queue.

9. A system for managing a transmit buffer using per priority pause flow control, the system comprising: a memory including packets to be transmitted; a plurality of parallel descriptor queues, each descriptor queue having a queue priority; a queue manager having an interface for receiving packet descriptors identifying packets in memory and an interface for receiving flow control messages, the queue manager assigning a priority to each descriptor and associated packet, and having an output for loading each descriptor into a descriptor queue having a queue priority associated with the descriptor priority; a transmit buffer having an interface for communication with the queue manager, an input to accept packets from the memory, and an output to supply packets for transmission to an Ethernet transmit processor; wherein the queue manager has an interface for reading a first descriptor from a selected first descriptor queue, the queue manager ordering the transmit buffer to load a first packet associated with the first descriptor, from the memory; wherein the queue manager, subsequent to the loading of the first packet in the transmit buffer, receives a per priority flow control message pausing first priority queue packets, orders the transmit buffer to flush the first packet, reads a second descriptor from a selected second descriptor queue, and orders the transmit buffer to load a second packet associated with the second descriptor, from the memory; and, wherein the transmit buffer transmits the second packet to the Ethernet transmit processor.

10. The system of claim 9 wherein the queue manager, subsequent to the transmission of the second packet, initiates a first queue packet reinstatement in response to an operation selected from a group consisting of receiving a per priority flow control message unpausing first priority packets and letting expire the per priority flow control message pausing the first priority packets, and orders the transmit buffer to load the first packet from memory; and,
   wherein the transmit buffer transmits the first packet to the Ethernet transmit processor.

11. The system of claim 9 wherein the transmit buffer has a capacity of up to 2 maximum size packets.

12. The system of claim 10 wherein the queue manager, subsequent to receiving the per priority flow control message, compares a combined length, equal to a first packet length plus the lengths of any first priority queue packets already in the transmit buffer, to a minimum length flush threshold, and if the combined length is greater than the flush threshold, orders the transmit buffer to flush the first packet, but if the combined length is less than the threshold, orders the transmit buffer to retain the first packet; and,
   wherein the transmit buffer transmits the first packet to the Ethernet transmit processor in response to the queue manager initiating the first queue packet reinstatement.

13. The system of claim 9 wherein the second descriptor queue is selected in response to the second descriptor queue being the highest priority queue, excluding the first descriptor queue from consideration.

14. The system of claim 10 further comprising:
   a holding queue, wherein the first descriptor is moved from the first descriptor queue to the holding queue in response to loading the first packet into the transmit buffer, and deleted from the holding queue in response to the transmit buffer transmitting the first packet.

15. The system of claim 9 wherein each descriptor queue is a FIFO.

* * * * *